(12) United States Patent
Haun

(10) Patent No.: US 10,517,212 B2
(45) Date of Patent: Dec. 31, 2019

(54) QUICK ATTACH ROTARY MOWER BLADE SYSTEM

(71) Applicant: Deere & Company, Moline, IL (US)

(72) Inventor: Robert D. Haun, Fuquay Varina, NC (US)

(73) Assignee: DEERE & COMPANY, Moline, IL (US)

( * ) Notice: Subject to any disclaimer, the term of this patent is extended or adjusted under 35 U.S.C. 154(b) by 178 days.

(21) Appl. No.: 15/723,868

(22) Filed: Oct. 3, 2017

(65) Prior Publication Data

US 2019/0098829 A1 Apr. 4, 2019

(51) Int. Cl.
*A01D 34/73* (2006.01)
*A01D 34/64* (2006.01)
*A01D 101/00* (2006.01)

(52) U.S. Cl.
CPC .......... *A01D 34/733* (2013.01); *A01D 34/64* (2013.01); *A01D 2101/00* (2013.01)

(58) Field of Classification Search
CPC ...... A01D 34/733; A01D 34/73; A01D 34/64; A01D 2101/00
See application file for complete search history.

(56) References Cited

U.S. PATENT DOCUMENTS

| | | |
|---|---|---|
| 3,877,146 A | 4/1975 | Pittinger |
| 4,527,360 A | 7/1985 | Dicke |
| 4,586,257 A | 5/1986 | Rittenhouse |
| 4,712,364 A | 12/1987 | Oxley |
| 5,163,276 A | 11/1992 | Mohrman |
| 5,622,035 A | 4/1997 | Kondo et al. |
| 5,782,073 A | 7/1998 | Sheldon |
| 5,960,617 A | 10/1999 | Sheldon |
| 6,205,755 B1 * | 3/2001 | Bontrager ............ A01D 34/733 56/17.5 |
| 6,367,235 B1 | 4/2002 | Moynihan |
| 6,681,865 B2 | 1/2004 | Pace |
| 6,688,095 B2 | 2/2004 | Wadzinski |
| 6,935,095 B1 | 8/2005 | Sluder |

(Continued)

FOREIGN PATENT DOCUMENTS

| | | |
|---|---|---|
| EP | 1048197 A1 | 11/2000 |
| WO | 2013049324 A1 | 4/2013 |
| WO | 2016037184 A1 | 3/2016 |

OTHER PUBLICATIONS

European Search Report issued in counterpart application No. 18197850.3 dated Apr. 1, 2019. (7 pages).

*Primary Examiner* — Robert E Pezzuto
*Assistant Examiner* — Joan D Misa

(57) ABSTRACT

A quick attach rotary mower blade system includes a spindle having a first pair of fan-shaped projections, and a spring-loaded collar having a bore through which the lower end of the spindle extends and a second pair of fan-shaped projections. A mower blade mounting hole includes a circular center opening and a pair of fan-shaped openings. The mower blade may be installed on the spindle by aligning the pair of fan-shaped openings with the first and second pairs of fan-shaped projections, moving the mower blade and spring-loaded collar upwardly, and rotating the mower blade and spring-loaded collar 90 degrees to interlock the second pair of fan-shaped projections between the first pair of fan-shaped projections.

12 Claims, 4 Drawing Sheets

(56) References Cited

U.S. PATENT DOCUMENTS

| | | | |
|---|---|---|---|
| 7,387,563 B2* | 6/2008 | Allemann | A61C 3/06 |
| | | | 451/342 |
| 7,484,736 B2* | 2/2009 | Allemann | B24B 45/006 |
| | | | 279/143 |
| 7,506,494 B2 | 3/2009 | Eavenson, Sr. et al. | |
| 7,614,940 B2 | 11/2009 | Jerome et al. | |
| 7,703,267 B2 | 4/2010 | Tapper | |
| 7,775,026 B2 | 8/2010 | Bever | |
| 7,784,254 B2 | 8/2010 | Bever | |
| 7,958,710 B2* | 6/2011 | Gilpatrick | A01D 34/733 |
| | | | 56/17.5 |
| 8,869,369 B1 | 10/2014 | Roach | |
| 8,931,248 B2 | 1/2015 | Eavenson, Sr. et al. | |
| 8,935,909 B2 | 1/2015 | Eavenson, Sr. et al. | |
| 9,113,595 B2 | 8/2015 | Roth et al. | |
| 9,363,946 B2* | 6/2016 | Pellenc | A01D 34/416 |
| 9,560,800 B2* | 2/2017 | Reichen | A01D 34/64 |
| 9,750,183 B2* | 9/2017 | Haun | A01D 34/733 |
| 9,924,632 B2* | 3/2018 | Chenevert | A01D 34/733 |
| 10,123,479 B2* | 11/2018 | Ladd, Jr. | A01D 34/733 |
| 10,327,384 B2* | 6/2019 | Johansson | A01D 34/64 |
| 2007/0006562 A1 | 1/2007 | Davis et al. | |
| 2007/0021044 A1 | 1/2007 | Allemann et al. | |
| 2011/0225832 A1 | 9/2011 | Alliss | |
| 2012/0110970 A1 | 5/2012 | Blarek | |
| 2014/0208710 A1 | 7/2014 | Roth et al. | |
| 2014/0230397 A1 | 8/2014 | Roth et al. | |
| 2015/0289447 A1 | 10/2015 | Reichen et al. | |
| 2016/0014957 A1 | 1/2016 | Johansson et al. | |
| 2016/0037716 A1 | 2/2016 | Johansson et al. | |
| 2017/0020067 A1 | 1/2017 | Haun | |

\* cited by examiner

QUICK ATTACH ROTARY MOWER BLADE SYSTEM

FIELD OF THE INVENTION

This invention relates to rotary mower blades on grass mowing machines, and specifically to the removal and installment of rotary mower blades to a mower deck spindle.

BACKGROUND OF THE INVENTION

One issue that may dissatisfy users and customers of grass mowing machines is the amount of time and difficulty needed to remove and install rotary mower blades for sharpening or replacement. The blades normally are installed with a center attachment bolt and washer assembly that threads into a mower deck spindle assembly. The bolt then needs to be torqued to secure the blade to the spindle assembly. Depending on the size of the mower deck and the number of spindle assemblies, center attachment bolts may be difficult to reach and attach a wrench or socket to each bolt and tighten it sufficiently. Additionally, due to limited ground clearance and accessibility to the underside of the mower deck, there may be limited space to provide adequate leverage to the wrench or socket to break the bolt loose. The amount of torque required to break a bolt loose can be substantial if the blade has not been changed for a long time. This may require an additional lever or wood block to lock the blade into position for proper torquing of the bolt.

Some users and customers of grass mowing machines may need to change rotary mower blades frequently because of heavy usage, such as mowing every day. Others may need to change rotary mower blades when the grass mowing machines are used at a distance from the blade changing tools. Additionally, users and customers may need to change rotary mower blades each time a different blade type is required. Each blade type may have a different depth, thicknesses, or edge shape to meet requirements of cut quality, lift, mulching, etc.

A quick attach rotary mower blade system is needed that allows removal and installment of a blade without a wrench or socket. A quick attach rotary mower blade system is needed that is easy to use. A quick attach rotary mower blade system is needed that does not require application of high torque to a center attachment bolt under the mower deck. A quick attach rotary mower blade system is needed that may secure blades having different depths, thicknesses, and edge shapes. A quick attach rotary mower blade system is needed that requires little or no modification of existing rotary spindles and/or mower blades.

SUMMARY OF THE INVENTION

A quick attach rotary mower blade system includes a mower blade with a mounting hole having a circular center opening and a pair of fan-shaped openings extending radially outwardly from the opening. The mower blade may be installed on a vertical spindle having a first pair of fan-shaped projections that may be aligned with a second pair of fan-shaped projections on a spring-loaded collar. The mower blade may be movable upwardly so that the mounting hole may slide past the first pair of fan-shaped projections and around the second pair of fan-shaped projections, and may compress a spring in the spring-loaded collar, and may be rotated along with the spring-loaded collar to move the second pair of fan-shaped projections out of alignment with the first pair of fan-shaped projections which remain in place under the mower blade. A compression spring urges the spring-loaded collar and the second pair of fan-shaped projections downwardly into a pair of gaps between the first pair of fan-shaped projections to clamp the mower blade to the vertical spindle.

The quick attach rotary mower blade system allows removal and installment of a blade without a wrench or socket, is easy to use, and does not require application of high torque to a center attachment bolt under the mower deck. The quick attach rotary mower blade system may secure blades having different depths, thicknesses, and edge shapes, and requires little or no modification of existing rotary spindles and/or mower blades.

DESCRIPTION OF THE PREFERRED EMBODIMENT

Figure 1:
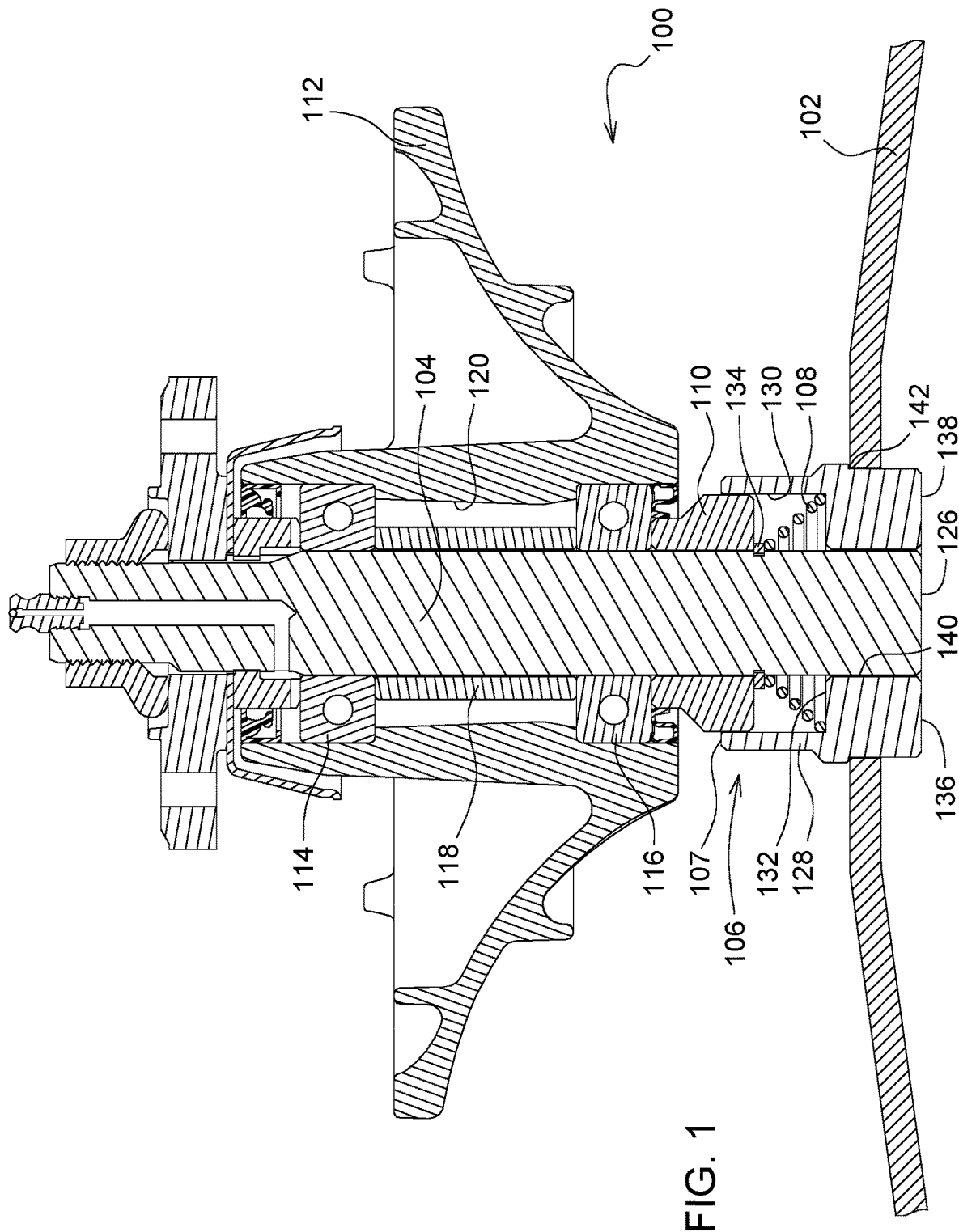
FIG. 1 is a side cross section view of a quick attach rotary mower blade system after a blade installed according to a first embodiment of the invention.

FIGS. 1-4 show one embodiment of quick attach rotary mower blade system 100 for use with one more rotary mower blades under a mower deck. The quick attach rotary mower blade system may be used to manually remove and install mower blade 102 to spindle 104 without tools. All of the components of the quick attach rotary mower blade system, including spring-loaded collar 106, compression spring 108, and spacer 110 may remain on the spindle when the mower blade is removed.

Figure 2:
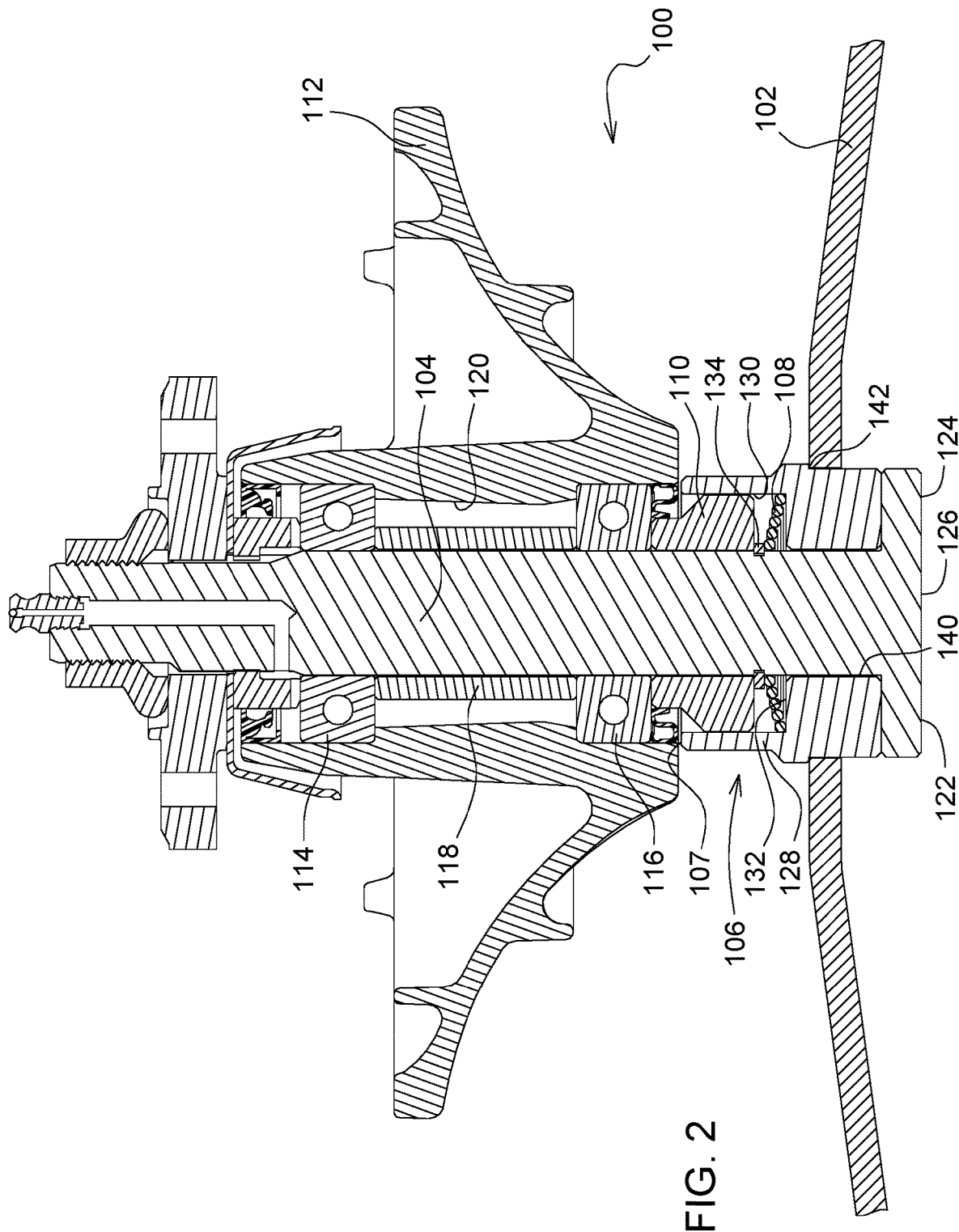
FIG. 2 is a side cross section view of a quick attach rotary mower blade system during installation of a mower blade according to a first embodiment of the invention.

In one embodiment shown in FIGS. 1 and 2, quick attach rotary mower blade system 100 may include spindle 104 rotatably mounted to flange 112 which may be attached with threaded fasteners to the underside of a mower deck. Bearings 114, 116 positioned on each end of sleeve 118 may be provided between the spindle and internal bore 120 extending through flange 112. Spindle 104 may be a cylindrical rod having a first or lower end 126 with a first pair of fan-shaped projections 122, 124 extending radially outwardly so that the end of the spindle may have a bow tie shape, as shown in FIGS. 3 and 4.

In one embodiment shown in FIGS. 1 and 2, quick attach rotary mower blade system 100 may include spring-loaded collar 106 slidably positioned around the first or lower end of spindle 104 where the spindle extends below flange 112. Spring-loaded collar 106 may include upper end 107 having a cylindrical body 128, compression spring 108, upwardly opening cavity 130, plate 132 at the lower end of the cavity, and cylindrical bore 140 extending through the plate. Compression spring 108 may be positioned in cavity 130 between plate 132 and spacer 110, and may apply force biasing the spring-loaded collar downwardly toward the first or lower end 126 of spindle 104. Compression spring 108 may have a conical shape to minimize the spring's thickness in its compressed state. As shown in FIG. 2, spring-loaded collar 106 may be pushed upwardly to compress spring 108 between plate 132 and spacer 110, causing the spring-loaded collar to slide upwardly over spacer 110. Retaining ring 134 may be positioned in a circumferential groove around spindle 104 to retain spacer 110 between flange 112 and spring-loaded collar 106. Spindle 104 may slide through bore 140 in plate 132. Spring-loaded collar 106 may have a second pair of fan-shaped projections 136, 138 on the underside of plate 132, each projection extending radially outwardly from bore 140. The second pair of fan-shaped projections may have substantially the same shape and dimensions as the first pair of fan-shaped projections 122, 124 on the lower end of spindle 104. Circumferential shoulder 142 also may be provided around the outer circumference of spring loaded collar 106 adjacent plate 132 and above the second pair of fan-shaped projections.

Figure 3:
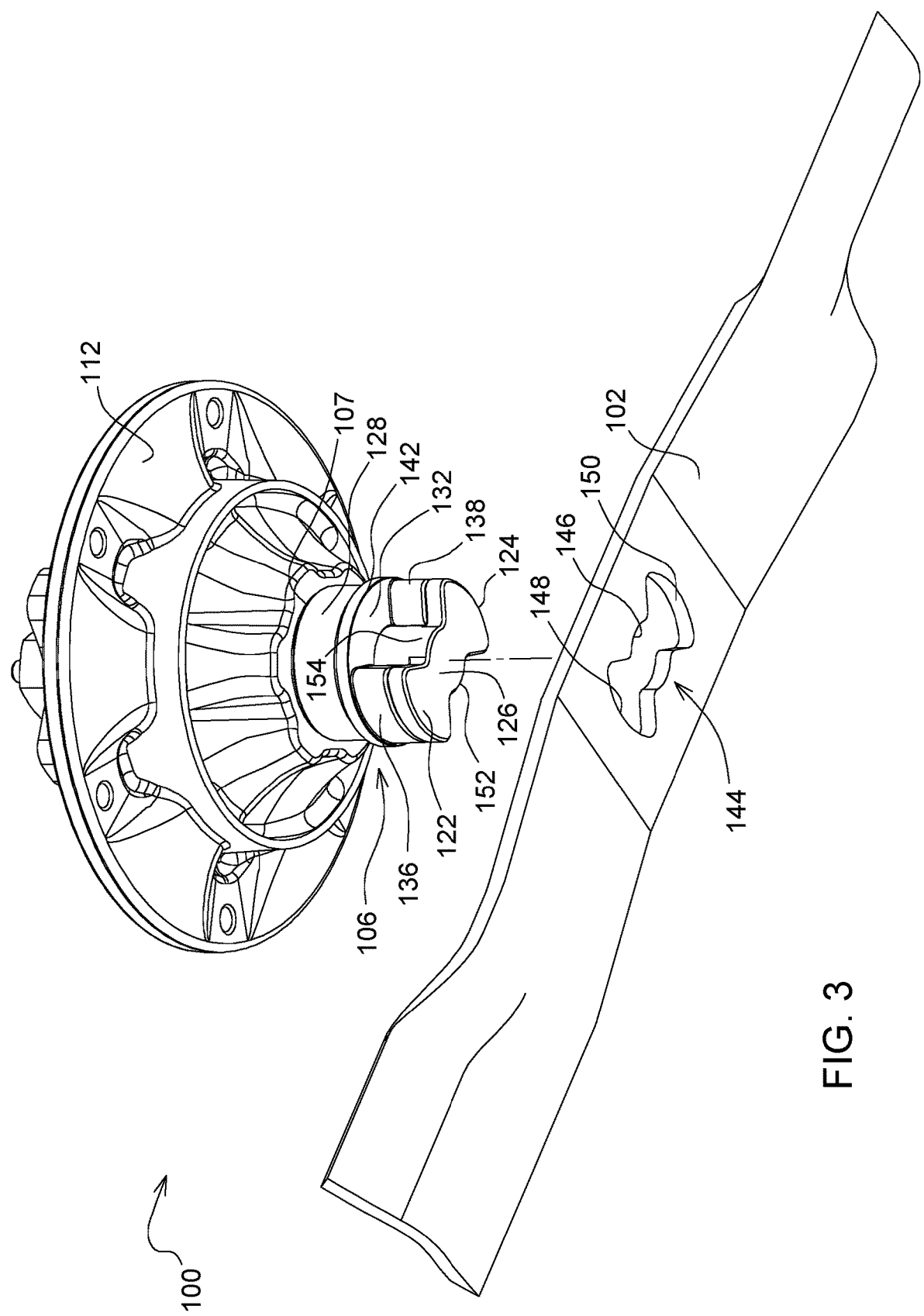
FIG. 3 is a side perspective view of a quick attach rotary mower blade system before the blade is installed according to a first embodiment of the invention.
Figure 4:
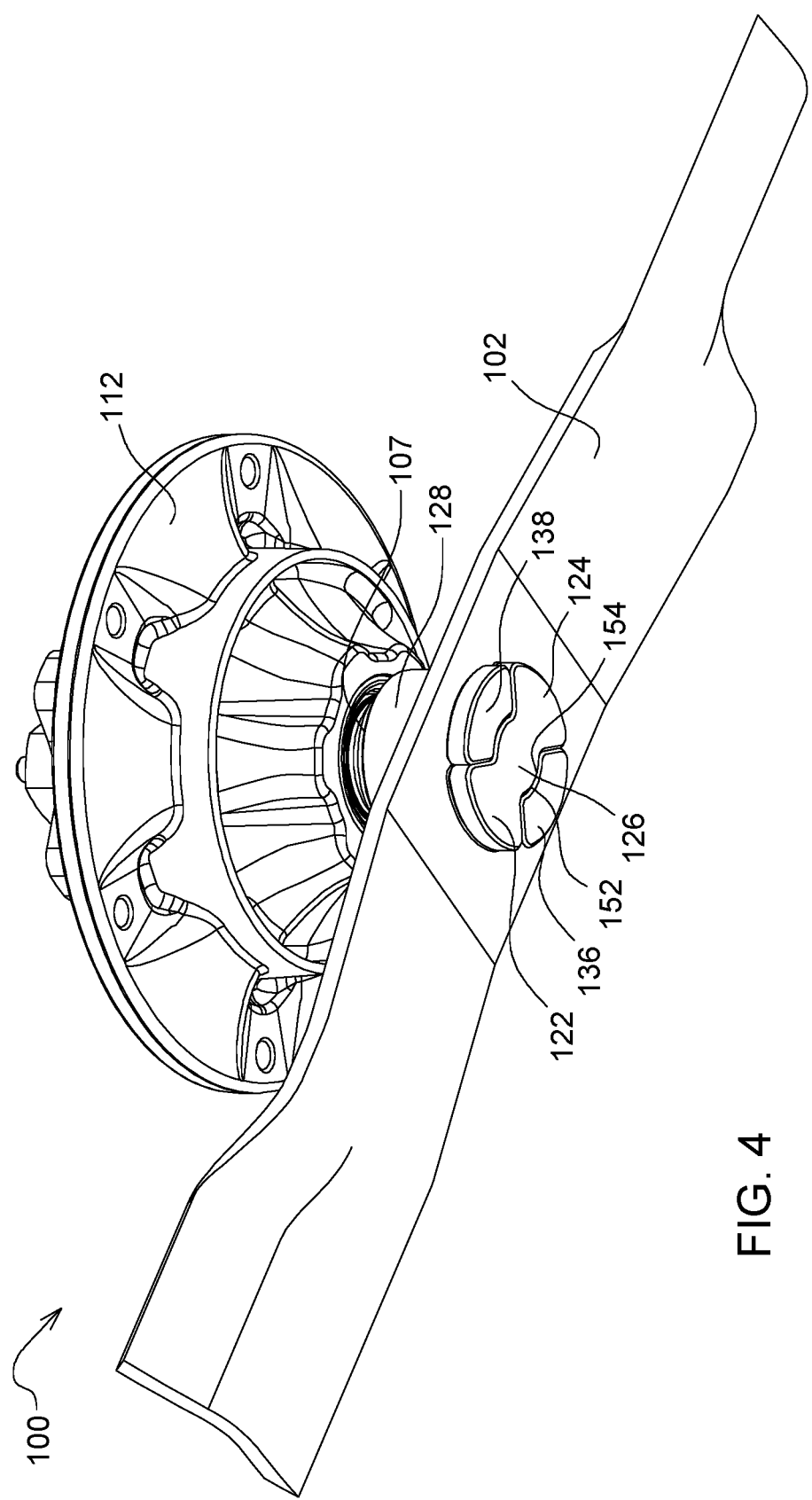
FIG. 4 is a side perspective view of a quick attach rotary mower blade system after the blade is installed according to a first embodiment of the invention.

In one embodiment shown in FIG. 3, quick attach rotary mower blade system 100 may include mower blade 102 having mower blade mounting hole 144. Mower blade mounting hole 144 may be centrally positioned on the blade, and may include circular center opening 146 and a pair of fan-shaped openings 148, 150 extending radially outwardly from the center opening so that the mounting hole has a bow tie shape.

In one embodiment shown in FIG. 3, mower blade 102 may be installed on quick attach rotary mower blade system 100 by aligning mower blade mounting hole 144 so that fan-shaped openings 148, 150 align with the first pair of fan-shaped projections 122, 124 on spindle 104, and with the second pair of fan-shaped projections 136, 138 on plate 132. Mower blade 102 may be moved upwardly so that mounting hole 144 may slide past the first pair of fan-shaped projections 122, 124 and around the second pair of fan-shaped projections 136, 138. Mower blade 102 may contact plate 132 and shoulder 142, and may be pushed up further against the plate and shoulder to compress spring 108. Mower blade 102 then may be rotated on its vertical axis of rotation, moving the second pair of fan-shaped projections 136, 138 out of alignment with the first pair of fan-shaped projections 122, 124 which remain in place under the mower blade. Once the mower blade has rotated 90 degrees, compression spring 108 may urge the second pair of fan-shaped projections 136, 138 downwardly into fan-shaped gaps 152, 154 between the first pair of fan-shaped projections 122, 124. Fan-shaped gaps 152, 154 may have the same or similar dimensions as the fan-shaped projections, so that the second pair of fan-shaped projections interlock between the first pair of fan-shaped projections, clamping the mower blade securely between the first pair of fan-shaped projections and the spring-loaded collar as shown in FIG. 4.

In one embodiment, the mower blade may be removed from the quick attach rotary mower blade system by pushing the blade upwardly against plate 132 and compression spring 108, rotating the blade 90 degrees until the first and second pairs of fan-shaped projections are aligned with each other, and then sliding the blade mounting hole downwardly off the spindle.

Having described the preferred embodiment, it will become apparent that various modifications can be made without departing from the scope of the invention as defined in the accompanying claims.

The invention claimed is:

1. A quick attach rotary mower blade system, comprising:
a spindle extending through a flange mounted on a mower deck, the spindle having a first pair of fan-shaped projections extending radially outwardly from a lower end thereof;
a spring-loaded collar having a bore through which the lower end of the spindle extends and having a second pair of fan-shaped projections extending radially outwardly from the bore; and
a mower blade having a mounting hole including a circular center opening and a pair of fan-shaped openings extending radially outwardly therefrom; the mower blade installable on the spindle by aligning the pair of fan-shaped openings with the first and second pairs of fan-shaped projections, moving the mower blade and spring-loaded collar upwardly, and rotating the mower blade and spring-loaded collar 90 degrees to interlock the second pair of fan-shaped projections between the first pair of fan-shaped projections.

2. The quick attach rotary mower blade system of claim 1 wherein the spring-loaded collar includes a conical compression spring positioned in an upwardly opening cavity.

3. The quick attach rotary mower blade system of claim 1 further comprising a spacer positioned between the spring-loaded collar and the flange.

4. The quick attach rotary mower blade system of claim 1 further comprising a circumferential shoulder around the outer circumference of the spring loaded collar.

5. A quick attach rotary mower blade system, comprising:
a spindle extending vertically through a spring-loaded collar;
a first pair of radially extending fan-shaped projections on a lower end of the spindle that are aligned with a second pair of radially extending fan-shaped projections on a lower end of the spring-loaded collar to extend through a mounting hole of a rotary mower blade; the spring-loaded collar rotatable to move the second pair of fan-shaped projections 90 degrees out of alignment with the first pair of fan-shaped projections to clamp the rotary mower blade between the first pair of fan-shaped projections and the spring-loaded collar.

6. The quick attach rotary mower blade system of claim 5 wherein the spring-loaded collar includes a plate from which the first and second pairs of fan-shaped projections extend downwardly.

7. The quick attach rotary mower blade system of claim 6 further comprising a circumferential shoulder around the spring-loaded collar.

8. The quick attach rotary mower blade system of claim 5 wherein the spring-loaded collar includes an upwardly facing cavity and a coil spring in the cavity.

9. The quick attach rotary mower blade system of claim 5 wherein the rotary mower blade mounting hole has a circular center opening and a pair of radially extending fan-shaped openings.

10. A quick attach rotary mower blade system, comprising:
a mower blade with a mounting hole having a circular center opening and a pair of fan-shaped openings extending radially outwardly from the opening, the mounting hole sliding onto a vertical spindle having a first pair of fan-shaped projections and a spring loaded collar with a second pair of fan-shaped projections;
the mower blade compressing a spring in the spring-loaded collar, and rotating along with the spring-loaded collar to move the second pair of fan-shaped projections out of alignment with the first pair of fan-shaped projections which remain in place under the mower blade; and
the spring urging the spring-loaded collar and the second pair of fan-shaped projections into a pair of gaps between the first pair of fan-shaped projections to clamp the mower blade to the vertical spindle.

11. The quick attach rotary mower blade system of claim 10 wherein the spring-loaded collar includes a vertical bore through which the spindle extends, a cavity with a plate where the spring is positioned, and a circumferential outer shoulder adjacent the plate.

12. The quick attach rotary mower blade system of claim 10 further wherein the mower blade rotates 90 degrees to position the second pair of fan-shaped projections into the pair of gaps between the first pair of fan-shaped projections.

* * * * *